United States Patent Office 3,102,918
Patented Sept. 3, 1963

3,102,918
PROCESS FOR THE PRODUCTION OF CRYSTAL-
LINE 1,2,3,4 - TETRAHYDRONAPHTHALENE - 1-
HYDROPEROXIDE
Rudolf Heise, Dusseldorf-Holthausen, Germany, assignor to Dehydag, Deutsche Hydrierwerke G.m.b.H., Dusseldorf, Germany, a corporation of Germany
No Drawing. Filed Feb. 16, 1959, Ser. No. 793,280
Claims priority, application Germany Feb. 20, 1958
3 Claims. (Cl. 260—610)

The present process relates to the production and isolation of pure crystalline 1,2,3,4-tetrahydronaphthalene-1-hydroperoxide.

The production of tetrahydronaphthalene-hydroperoxide is accomplished by oxidation of 1,2,3,4-tetrahydronaphthalene with oxygen or oxygen-containing gases at elevated temperatures, at atmospheric or elevated pressure and in the presence or absence of catalysts. A number of processes for the isolation of the tetrahydronaphthalene-hydroperoxide from the oxidation product are known, and among them the following appear to have acquired a certain importance.

In accordance with one of these processes the excess tetrahydronaphthalene is removed from the oxidation solution entirely or partially by vacuum distillation, and the residue is cooled to low temperatures (—50° C.). The tetrahydronaphthalene-hydroperoxide thereby crystallizes out and is then purified by recrystallization. The yields of pure crystalline tetrahydronaphthalene-hydroperoxide obtained by this method are, however, not very satisfactory and under the most favorable circumstances amount to only about 44–57%, based on the original peroxide content in the oxidation solution.

In accordance with another prior art process, the solution of the hydroperoxide in tetrahydronaphthalene is treated with sodium hydroxide, whereby the sodium compound of the tetrahydronaphthalene-hydroperoxide separates out as a precipitate, which is filtered off, washed with an organic solvent and dissolved in water. The raw tetrahydronaphthalene-hydroperoxide is liberated from the aqueous solution with acetic or sulfuric acid and is subsequently purified by recrystallization. It has long been known, however, that tetrahydronaphthalene-hydroperoxide readily decomposes in alkaline as well as acid media, forming primarily 1-hydroxy- and 1-keto-tetrahydronaphthalene in addition to acid and ester-like products. There are even a number of processes which intentionally make use of this property of tetrahydronaphthalene-hydroperoxide in order to produce 1-hydroxy- and 1-keto-tetrahydronaphthalene which are useful as solvents and for other purposes. No further explanation is therefore needed for the fact that even if great care is exercised the above-mentioned decomposition reactions are released by contact of the tetrahydronaphthalene-hydroperoxide with soduim hydroxide or acids and thus cause substantial reductions in the yield. The yields of crystalline tetrahydronaphthalene-hydroperoxide obtained by this process must therefore necessarily be poor; in fact, they are so poor that the disclosures of these processes do not even intimate what the yields are.

It is therefore an object of this invention to provide a process for producing 1,2,3,4-tetrahydronaphthalene-1-hydroperoxide in greater yield and a purer state.

This and other objects of my invention will become apparent as the description thereof proceeds.

I have now found that crystalline tetrahydronaphthalene-hydroperoxide may be obtained with surprisingly high yields and in an excellently pure state by treating the primary oxidation product of tetrahydronaphthalene, which contains the hydroperoxide in dissolved form, with a compound which has a large surface area, such as silicagel, subsequently displacing the excess tetrahydronaphthalene with a non-polar solvent, and finally desorbing the adsorbed tetrahydronaphthalene-hydroperoxide with the aid of a polar solvent which upon evaporation thereof leaves the tetrahydronaphthalene-hydroperoxide behind in pure, crystalline form.

The oxidation of the tetrahydronaphthalene into tetrahydronaphthalene-hydroperoxide may be accomplished in accordance with known methods by treating the tetrahydronaphthalene in liquid phase, at elevated temperatures and atmospheric or elevated pressures, in the presence or absence of catalysts with oxygen or oxygen-containing gases. However, the higher the peroxide content which is reached in the oxidation product, i.e. the longer the oxidation lasts, the more the inclination of the tetrahydronaphthalene-hydroperoxide toward self-decomposition will make itself noticed. As a result of this side reaction, which is further favored by the prevailing reaction temperature as well as by the possible presence of heavy metal catalysts, the oxidation solution contains more or less pronounced quantities of oxygen-containing decomposition products which reduce the quantity and quality of the crystalline tetrahydronaphthalene-hydroperoxide during the subsequent separation procedure. It is therefore advantageous to discontinue the oxidation before appreciable quantities of the decomposition products have formed. For this purpose the oxidation is allowed to proceed for only a short period of time so as to reach a low peroxide content of less than 10%, preferably 1–5%, and the tetrahydronaphthalene-hydroperoxide formed thereby is immediately withdrawn from the reaction mixture by treatment with an adsorption agent, whereby its decomposition is prevented.

Since the decomposition of tetrahydronaphthalene-hydroperoxide is favored by elevated temperatures, the oxidation temperature being sufficiently high to bring about such decomposition, it is advantageous to cool the oxidation product to temperatures which lie below the oxidation temperature, preferably to between 0 and 20° C., prior to the treatment with the adsorption agent. Working with a cooled oxidation solution is also particularly advantageous because the heat of adsorption liberated during the adsorption step again causes a distinctly measurable increase in the temperature. For this reason it is even advantageous to provide the adsorption apparatus, for instance an adsorption column, with an additional cooling device which may take the form of an exterior or interior cooling system or a combination of both, depending upon the size of the apparatus.

In addition to silicagel, examples of suitable adsorption agents with large surface areas are aluminum oxide, magnesiagel, zirconium oxide, adsorptive earths, activated or animal charcoal, cellulose and others, either alone or in admixture with each other. The adsorbent may form the stationary phase over which the oxidation solution is allowed to flow as the mobile phase, for example in an adsorption column. The adsorption step may also be carried out by bringing the absorbent in granulated or powder form into intimate contact with the oxidation solution by stirring, shaking or the like, and then separating the adsorbent by filtration, centrifuging, decanting or the like.

Since the adsorbent not only adsorbs the tetra-hydronaphthalene-hydroperoxide but also ties up part of the excess tetrahydronaphthalene by capillary action, it is necessary to displace the capillary tetrahydronaphthalene with the aid of a low-boiling-point non-polar solvent. Otherwise, the capillary tetrahydronaphthalene would pass into the eluate along with the tetrahydronaphthalene-hydroperoxide in the subsequent operation and would thus make the crystallization of the tetrahydronaphthalene-hydroperoxide more difficult after the evaporation of the elution agent.

Examples of suitable non-polar solvents are primarily low-boiling-point aliphatic hydrocarbons, such as pentane, hexane, heptane or mixtures thereof which are known under the names of petroleum ether, light gasoline or the like. Similarly, the lower homologs ethane, propane and butane may be used, provided the displacement operation takes place under such pressures that the hydrocarbons are in liquid form. Similarly suitable for this purpose are low-boiling-point cyclo-paraffins such as cyclopentane, cyclohexane, methylcyclohexane, as well as low-boiling-point aromatics such as benzene and toluene. As a result of its low boiling point the portion of the solvent which is adsorbed by capillary action in place of the displaced tetrahydronaphthalene and which passes into the eluate during the subsequent operation, can be readily removed by evaporation together with the elution agent.

Suitable polar solvents for the desorption of the tetrahydronaphthalene-hydroperoxide also include primarily compounds with a low-boiling point. Particularly suitable are, for example, alcohols such as methyl alcohol, ethyl alcohol and isopropyl alcohol, ethers such as diethyl ether, and di-isopropyl ether, tetrahydrofuran, ketones such as acetone and methyl-ethyl ketone, esters such as ethyl acetate and propyl acetate, halogen-containing, nitrogen-containing and sulfur-containing compounds such as chloroform, dichloroethane, acetonitrile, and carbon disulfide and the like. For reasons of economy, methyl alcohol and acetone are preferred.

As long as the adsorption agent is not saturated with tetrahydronaphthalene-hydroperoxide, the tetrahydronaphthalene left over after the adsorption step is free from hydroperoxide and can immediately be used for a subsequent oxidation procedure. After being subjected to redistillation, whereby it is separated from entrained tetrahydronaphthalene, the non-polar solvent can be reused, as can the tetrahydronaphthalene. The polar solvent solution is evaporated at as low a temperature as possible in order to provide gentle conditions for the tetrahydronaphthalene-hydroperoxide; the polar solvent can be condensed and can be used over again. The residue is tetrahydronaphthalene-hydroperoxide in the form of a practically colorless crystalline mass which may be further purified by recrystallization, if desired. After the desorption of the tetrahydronaphthalene-hydroperoxide the adsorbent is still contaminated with a portion of the polar solvent. However, this solvent component may readily be removed and recondensed with the aid of a dry stream of air or another inert gas such as nitrogen, hydrogen or carbon dioxide. The adsorbent may in this simple fashion be completely regenerated and may be reused many times without noticeably sacrificing any of its adsorption capability.

If silicagel is used as the adsorbent, for example, the required specific amount of adsorbent to bring about a complete adsorption of tetrahydronaphthalene-hydroperoxide is about 5 to 8 grams per gram of 1,2,3,4-tetrahydronaphthalene-1-hydroperoxide, which corresponds to a saturation value of 0.12 to 0.20 gm. tetrahydronaphthalene-hydroperoxide per gram silicagel. As soon as this value is reached, the adsorbent is saturated with tetrahydronaphthalene-hydroperoxide. It is advantageous to operate under such conditions that no more hydroperoxide is offered to the adsorbent for adsorption than it is capable of adsorbing, because only in this manner is it possible to isolate the hydroperoxide completely from the oxidation solution. The yield of pure, crystalline tetrahydronaphthalene-hydroperoxide which may be obtained by means of the present process is practically 100%, based on the iodometrically determined peroxide content in the oxidation solution, provided the total amount of tetrahydronaphthalene-hydroperoxide present in the oxidation solution does not exceed the saturation value of the particular adsorbent employed. If only a portion of the hydroperoxide is adsorbed because of the presence of more hydroperoxide than the adsorbent is capable of adsorbing, the yield is also practically 100% based upon the adsorbed portion.

Because of its varied utilities the 1,2,3,4-tetrahydronaphthalene-1-hydroperoxide has come into ever increasing demand; for example, it is used as a vulcanization accelerator, as a catalyst for oxidation, condensation, and polymerization processes, as an oxidizing agent, as a flotation auxiliary agent, as a stabilizing agent for polyvinyl chloride, as an anti-corrosion agent, as a motor fuel additive, and as an intermediate product for the production of alcohols, ketones, carboxylic acids, and other compounds.

The process, which may readily be carried out in continuous fashion, is further illustrated in the following examples.

These examples are set forth to enable persons skilled in the art to better understand and practice my invention and are not intended to be limitative.

*Example I*

Technical grade tetrahydronaphthalene was oxidized with air into tetrahydronaphthalene-hydroperoxide at 70 to 75° C. As soon as the peroxide content reached a value of 2% the oxidation was interrupted and the oxidation product was immediately cooled to 10° C. 1 kg. of this oxidation solution (containing 20 gm. tetrahydronaphthalene-hydroperoxide) was passed through an adsorption column having a length of 1600 mm. and a diameter of 15 mm. which was charged with 250 gm. silicagel (grain size 0.15–0.6 mm.); by providing a slight subatmospheric pressure the filtration was accelerated. The unadsorbed tetrahydronaphthalene was free from peroxide. For the purpose of removing the tetrahydronaphthalene which was adsorbed by capillary action, the column was washed with 500 cc. petroleum ether. The petroleum ether solution was free from peroxide. The adsorbed tetrahydronaphthalene-hydroperoxide was desorbed by washing with 500 cc. acetone. The acetone solution contained 20.1 gm. hydroperoxide, as determined by a peroxide determination procedure. After evaporating the acetone, tetrahydronaphthalene-hydroperoxide remained behind as a colorless residue which crystallized after a short period of standing. The yield was 20.0 gm., and the product had a melting point of 55° C.

*Example II*

1 kg. of a 6% solution of tetrahydronaphthalene-hydroperoxide in tetrahydronaphthalene was fed into an adsorption column as described in Example I which was charged with 250 gm. silicagel. The amount of tetrahydronaphthalene-hydroperoxide contained in this solution, namely 60 gm., exceeded the absorption capability of the silicagel column. Consequently, the tetrahydronaphthalene leaving the column contained a portion of the excess tetrahydronaphthalene-hydroperoxide, namely 19.3 gm. By washing the column with 500 cc. petroleum ether, 4.2 gm. hydroperoxide were removed with tetrahydronaphthalene which had been adsorbed by capillary action. Accordingly, 36.5 gm. tetrahydronaphthalene-hydroperoxide had been adsorbed. The absorbed tetrahydronaphthalene-hydroperoxide was desorbed with the aid of 500 cc. acetone. After evaporation of the acetone solution, a crystalline residue remained behind. The yield was 36.7 gm. of a product having a melting point of 54° C.

*Example III*

1 kg. oxidized tetrahydronaphthalene which contained 2.8% tetrahydronaphthalene-hydroperoxide and had been cooled to 15° C. was passed through an adsorption column having a length of 1350 mm. and a diameter of 17 mm. which was charged with 112 gm. of granulated activated charcoal (grain size 0.1 to 0.5 mm.). Because of the strong evolution of heat of adsorption liberated during the adsorption procedure, the absorption column was surrounded with a cooling jacket. After the tetrahydronaphthalene had passed through the column and the column had been washed with 500 cc. petroleum ether, 7.2 gm. tetrahydronaphthalene-hydroperoxide remained in the column. This quantity was desorbed with 500 cc. acetone and it crystallized after evaporating the acetone. After regeneration of the adsorption column with air, the same column was charged under otherwise identical conditions with a 2.4% hydroperoxide solution. 500 cc. cyclohexane were used for the washing step. 7.6 gm. hydroperoxide remained adsorbed and were desorbed with 500 cc. tetrahydrofuran. After evaporating the tetrahydrofuran solution the hydroperoxide remained behind as a crystalline residue. In both cases, the yield of crystalline tetrahydronaphthalene-hydroperoxide was practically quantitative, based on the absorbed portion; the saturation value was about 0.06 to about 0.07 gm. hydroperoxide per gm. activated charcoal.

*Example IV*

A solution of tetrahydronaphthalene-hydroperoxide in tetrahydronaphthalene which had been cooled to 15° C. was fed into an adsorption column as described in Example 1 which had been charged with 250 gm. silicagel (grain size 0.3 to 0.6 mm.); in order to achieve definite saturation in the column, the solution contained more hydroperoxide than the column was capable of absorbing. The excess tetrahydronaphthalene as well as the unadsorbed hydroperoxide were washed out of the column with 500 cc. petroleum ether, and the absorbed hydroperoxide was then desorbed with 500 cc. acetone. Thereafter, dry air was aspirated through the column for two hours. Subsequently, the absorption procedure was repeated. Despite repetition of this procedure for 23 times, no decrease of the adsorption capability of the regenerated silicagel could be noted, as shown by the quantity of absorbed tetrahydronaphthalene-hydroperoxide which was desorbed with acetone for each case shown in sequence in the following table.

1. 35.7 gm.
2. 32.4 gm.
3. 33.8 gm.
4. 34.3 gm.
5. 34.2 gm.
6. 38.3 gm.
7. 41.2 gm.
8. 38.0 gm.
9. 37.0 gm.
10. 34.7 gm.
11. 38.3 gm.
12. 25.4 gm.
13. 37.3 gm.
14. 36.2 gm.
15. 37.0 gm.
16. 33.8 gm.
17. 43.8 gm.
18. 36.0 gm.
19. 37.2 gm.
20. 37.1 gm.
21. 34.1 gm.
22. 36.0 gm.
23. 34.2 gm.

On the average 36.0 gm. tetrahydronaphthalene-hydroperoxide were obtained, which corresponds to a specific saturation value of 0.144 gm. tetrahydronaphthalene-hydroperoxide per gram silicagel.

While I have set forth certain specific embodiments and preferred modes of operation of my invention, it will be understood that they are not intended to be limitative and that various changes and modifications may be made in the invention without departing from the spirit of the disclosure or the scope of the appended claims.

I claim:

1. A process for the production of crystalline 1,2,3,4-tetrahydronaphthalene-1-hydroperoxide by oxidation of 1,2,3,4-tetrahydronaphthalene in liquid phase, comprising the steps of continuing the oxidation to a peroxide content of 1 to 5%, cooling the oxidation solution obtained to a temperature of about 0 to 20° C., treating said oxidation solution with an adsorbent selected from the group consisting of silica gel and activated charcoal in an amount to adsorb substantially all tetrahydronaphthalene-hydroperoxide, wherein said cooling is continued during said adsorption, washing the adsorbed tetrahydronaphthalene-hydroperoxide with a nonpolar solvent, selected from the group consisting of petroleum ether and cyclohexane in sufficient quantity to remove substantially all excess tetrahydronaphthalene adhering to said adsorbent while said hydroperoxide remains adsorbed, said quantity being up to 15% based on the volume of the extraction column, desorbing the tetrahydronaphthalene-hydroperoxide with a polar solvent selected from the group consisting of acetone and tetrahydrofuran in sufficient quantity to effect complete desorption, said quantity being up to 15% based on the volume of the extraction column, and evaporating said polar solvent to separate 1,2,3,4-tetrahydronaphthalene-hydroperoxide in a yield of 100% based on the adsorbed hydroperoxide.

2. A process for the production of crystalline 1,2,3,4-tetrahydronaphthalene-1-hydroperoxide by oxidation of 1,2,3,4-tetrahydronaphthalene in liquid phase, comprising the steps of continuing said oxidation to a peroxide content of 1 to 5%, cooling the oxidation solution obtained to a temperature of about 0 to 20° C., treating said oxidation solution with silica gel as an adsorbent in an amount of about 1 gm. per 0.12 to 0.20 gm. of tetrahydronaphthalene hydroperoxide to adsorb substantially all tetrahydronaphthalene-hydroperoxide wherein said cooling is continued during said adsorption, washing the adsorbed tetrahydronaphthalene-hydroperoxide with a nonpolar solvent petroleum ether in sufficient quantity to remove all excess tetrahydronaphthalene adhering to said adsorbent while said hydroperoxide remains adsorbed, said quantity being up to 15% based on the volume of the extraction column, desorbing the tetrahydronaphthalene-hydroperoxide with a polar solvent acetone in sufficient quantity to effect complete desorption, said quantity being up to 15% based on the volume of the extraction column, and evaporating said polar solvent to separate 1,2,3,4-tetrahydronaphthalene-hydroperoxide in a yield of 100% based on the adsorbed hydroperoxide.

3. A process for the production of crystalline 1,2,3,4-tetrahydronaphthalene-1-hydroperoxide by oxidation of 1,2,3,4-tetrahydronaphthalene in liquid phase, comprising the steps of continuing the oxidation to a peroxide content of 1 to 5%, cooling the oxidation solution obtained to a temperature of about 0 to 20° C., treating said oxidation solution with activated charcoal as an adsorbent in an amount of about 1 gm. per 0.06 to 0.07 gm. of tetrahydronaphthalene hydroperoxide to adsorb substantially all tetrahydronaphthalene-hydroperoxide wherein said cooling is continued during said adsorption, washing the adsorbed tetrahydronaphthalene-hydroperoxide with a non-polar solvent cyclohexane in sufficient quantity to remove substantially all excess tetrahydronaphthalene adhering to said adsorbent while said hydroperoxide remains adsorbed, said quantity being up to 15% based on the volume of the extraction column, desorbing the tetrahydronaphthalene-hydroperoxide with a polar solvent tetrahydrofuran in sufficient quantity to effect complete desorption, said quantity being up to 15% based on the volume of the extraction column, and evaporating said polar solvent to separate 1,2,3,4-tetrahydronaphthalene-hydroperoxide in a yield of 100% based on the adsorbed hydroperoxide.

References Cited in the file of this patent

UNITED STATES PATENTS

| | | |
|---|---|---|
| 2,511,957 | Wicklatz et al. | June 20, 1950 |
| 2,568,639 | Johnson | Sept. 18, 1951 |
| 2,605,290 | Robertson et al. | July 29, 1952 |
| 2,700,057 | Punderson | Jan. 18, 1955 |

OTHER REFERENCES

Robertson et al. (B), Trans. Faraday Soc., vol. 42 (1946), 201–210 (10 pages), No. 610B (Patent Office Library).